United States Patent [19]

Neefe

[11] Patent Number: 4,524,035
[45] Date of Patent: Jun. 18, 1985

[54] METHOD OF MAKING BIFOCAL LENS BLANKS

[76] Inventor: Charles W. Neefe, 811 Scurry St., Box 429, Big Spring, Tex. 79720

[21] Appl. No.: 618,746

[22] Filed: Jun. 8, 1984

[51] Int. Cl.$^3$ .............................................. B29D 11/00
[52] U.S. Cl. ...................................... 264/1.8; 264/2.7
[58] Field of Search ............... 264/1.1, 1.7, 1.8, 2.7; 425/808

[56] References Cited

U.S. PATENT DOCUMENTS

| 3,270,099 | 8/1966 | Camp | 264/1.8 |
| 3,431,327 | 3/1969 | Tsuetaki | 264/1.8 |
| 3,440,306 | 4/1969 | Neefe | 264/1.8 |
| 3,560,598 | 2/1971 | Neefe | 264/1.8 |
| 3,662,040 | 5/1972 | Urbach et al. | 264/1.8 |
| 3,773,868 | 11/1973 | Bronstein | 264/1.8 |
| 3,984,506 | 10/1976 | Tsuetaki | 264/1.8 |

FOREIGN PATENT DOCUMENTS 1045065 10/1966 United Kingdom ............... 264/1.7

*Primary Examiner*—James Lowe

[57] ABSTRACT

A method of making bifocal resinous lenses by providing a positioning cylinder connected to a low refractive index polymer. Cutting a convex optical surface orientated to the positioning cylinder. A high index polymer is cast on the low index optical surface and a second shorter radius convex optical surface which intersects both the high and low refractive index materials is cut and polished. Additional low index polymer is cast over the second shorter radius surface and polymerized. A bifocal lens blank is cut from the polymer mass having the high refractive index surfaces orientated to the exterior blank surfaces.

14 Claims, 6 Drawing Figures

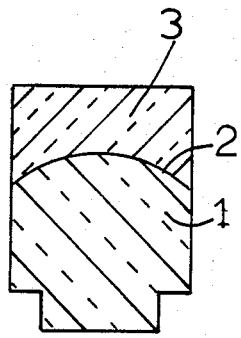
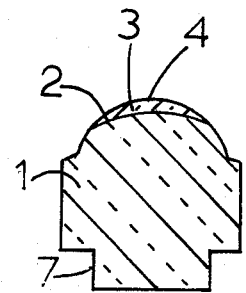
FIG 2
FIG 3
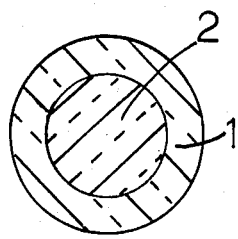
FIG 5
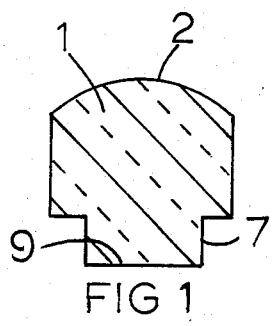
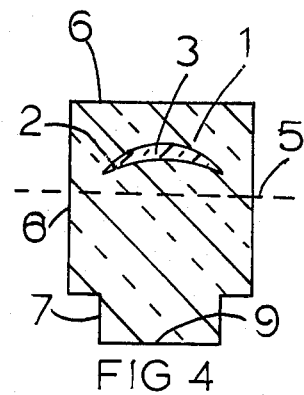
FIG 1
FIG 4
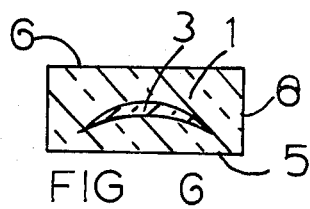
FIG 6

METHOD OF MAKING BIFOCAL LENS BLANKS

PRIOR ART

The first bifocal contact lenses were composed of plastics of two different refractive index and had round segments with the optical center located at the geometric center of the reading segments. This causes a degree of image displacement due to the base down prism encountered with the transition from the distant segment to the near segment. This displacement requires reorientation and is a source of distraction. Also the upper edge of the segment is curved with a radius equal to the radius of the segment (Camp U.S. Pat. No. 3,270,099).

The following improvement was the shaped segment wherein the reading segment was semi-circular in shape (Neefe U.S. Pat. Nos. 3,560,598 and 3,597,055).

Using the herein disclosed process, any segment configuration may be made. It is understood that any segment shape is possible and any placement of the optical center is also possible with the present invention. It is desirable however, to emply the monocentric design and place the optical center of the reading segment tanget to the upper edge of the reading segment. Also many suitable types of plastics and adhesives may be substituted for those stated herein.

IN THE DRAWINGS

FIG. 1 shows the low refractive index material in section.

FIG. 2 shows the low and high refractive index material in section.

FIG. 3 shows the radii cut on the materials in section.

FIG. 4 shows the segment incased in low refractive index material in section.

FIG. 5 shows the finished lens blank from the top in section.

FIG. 6 shows the finished lens blank from the side in section.

THE BIFOCAL LENSES ARE MADE AS FOLLOWS

A blank of transparent low refractive index resinous lens material, 1 FIG. 1, is provided. The end, 9 FIG. 1, trued flat and the sides, 7 FIG. 1, are turned in a suitable diameter positioning for holding in a precision step collet. The diameter of the holding step 7 is smaller than the finished lens diameter, 6 FIGS. 4 and 6. This allows the diameter, 6 FIG. 4, to be lathe cut without the cutting tool striking the collet which holds the positioning step, 7 FIG. 4. The positioning step, 7 FIG. 2, is placed in a step collet and secured. The optical surface, 2 FIG. 1, is cut and polished. The distance from flat surface, 9 FIG. 1, to the convex optical surface, 2 FIG. 1, is carefully measured and recorded. A high refractive index resinous material is cast as a liquid monomer on surface 2 FIG. 2 and polymerized to form a high index solid, 3 FIG. 2. A second short radius convex curve is cut, 4 FIG. 3, which intersects to the longer radius, 2 FIG. 3 and both the high index material, 3 FIG. 3 and the low index material, 1 FIG. 3. The high index segment 3 FIG. 3 may now be shaped to any desired configuration by cutting away parts of the high index material, 3 FIG. 3 and leaving only that part desired. The optical surface 4 FIG. 3 is left undisturbed in the desired shaped area. The remaining parts not desired of the high index segment, 3 FIG. 3 are completely removed.

Monocenter segments such as crescent shaped, flat top or other desired shapes are made by cutting to the center of surface, 2 FIG. 5. The optical center will then be at the edge of the high index segment at that point. The same low index material 1 FIG. 4 is cast as a liquid monomer on the low and the high index material 3 FIG. 4 and polymerized to form homogeneous monolithic low index solid.

The location of the optical surface 2 FIGS. 1, 2, 3 and 4 in relation to the flat surface 9 FIGS. 1, 2, 3 and 4 is known and recorded. The positioning step 7 FIG. 4 is placed in a lathe step collet and the flat surface 6 FIG. 4 is lathe cut to a predetermined distance from the flat surface 9 FIG. 4. The sides of the lens blank 8 FIG. 4 are lathe turned and smoothed. The lens blank is cut to a predetermined thickness and cut at the parting line 5 FIG. 4. The three above lathe cuts are performed without removing the positioning step from the lathe collet.

The finished lens blank disk FIG. 6 has two parallel flat surfaces 5 and 6 FIG. 6, and a cylinderical edge surface 8 FIG. 6. The high refractive index optical segment 3 FIG. 6 is imbedded within the low refractive index material 1 FIG. 6 and is mechanically and optically orientated with the three exterior surfaces 5, 6 and 8 FIG. 6.

Polymers permeable to atmospheric gases may be used to improve the wearing qualities of the bifocal lenses.

Hydrophilic and hydrogel materials may be used to provide soft bifocal lenses.

Elastomeric materials such as transparent silicones may also be used to produce elastomeric bifocal lenses by molding the optical surfaces 2 FIG. 1 and 4 FIG. 3. If molding is used, no cutting or polishing is required. Molding by injection, compression and casting have been used to produce bifocals.

I claim:

1. A method of making bifocal resinous lens blanks by the steps of, providing a positioning cylinder connected to a low refractive index polymer, placing the positioning cylinder in a lathe collet and cutting a first convex optical surface orientated with the positioning cylinder, casting a high refractive index liquid monomer on the convex surface of the low refractive index polymer polymerizing the high refractive index monomer to form a high refractive index polymer, placing the positioning cylinder in a lathe collet a second time and cutting a second shorter radius optical surface orientated with the positioning cylinder and intersecting the first longer radius optical surface and both the low refractive index polymer material and the high refractive index polymer material, casting low refractive index monomer over the second shorter radius optical surface and polymerizing the monomer to form a monolithic mass to form a blank from which a bifocal lens is made.

2. A method of making bifocal resinous lens blanks by the steps of, providing a positioning cylinder on a low refractive index polymer, placing the positioning cylinder in a lathe and cutting a first convex optical surface orientated with the positioning cylinder, casting a high refractive index liquid monomer on the convex low refractive index optical surface, polymerizing the high index monomer to form a high refractive index polymer, placing the positioning cylinder in a lathe a second time and cutting a second shorter radius optical surface orientated with the positioning cylinder and intersecting the first longer radius optical surface and both the low refractive index polymer material and the high refractive index polymer material, shaping the high refractive index material by removing unwanted high refractive index material to provide the desired shape to the high refractive index segment, casting additional low refractive index monomer over the second shorter radius optical surface and polymerizing the monomer to form a monolithic mass, placing the positioning cylinder in a lathe a third time and turning the sides of the low index monolithic mass to form a cylinder of predetermined diameter, removing the bifocal lens blank from the positioning cylinder by making two parallel cuts at a 90° angle to the side of the cylinder and at a predetermined distance from the positioning cylinder separating and freeing the lens blank from the positioning cylinder.

3. A method of making bifocal resinous blanks by the steps of, providing a positioning cylinder on a low refractive index polymer, cutting a first convex optical surface orientated with the positioning cylinder, casting a high refractive index liquid monomer on the convex surface of the low refractive index polymer, polymerizing the high refractive index monomer to form a high refractive index polymer, placing the positioning cylinder in a lathe a second time and cutting a second shorter radius optical surface orientated with the positioning cylinder and intersecting the first longer radius optical surface and both the low refractive index polymer material and the high refractive index polymer material, casting additional low refractive index liquid monomer over the second shorter radius optical surface and polymerizing the monomer to form a polymer monolithic mass, placing the positioning cylinder in a lathe a third time and turning the sides of the low index monolithic polymer mass to form a cylinder of predetermined diameter, removing the bifocal lens blank from the positioning cylinder by making two parallel cuts at a 90° angle to the sides of the cylinder separating and freeing the lens blank from the positioning cylinder.

4. A method of making resinous bifocal lens blanks wherein a higher refractive index resinous lens material is cast on a convex optical surface of a lower refractive index resinous lens material, a second shorter convex radius optical surface is cut which intersects both the higher refractive index lens material and the first lower refractive index lens material, the shorter radius convex optical curve and the longer radius convex optical curve have the same optical axis and optical center, a second low refractive index resinous lens material is cast over the first lower refractive index material and the higher refractive index lens material to form a bifocal lens blank.

5. A method as in claim 1 wherein the high refractive index lens material is shaped by cutting away unwanted high index resinous material before casting the second low refractive index resinous material.

6. A method as in claim 3 wherein the high refractive index lens material is shaped by cutting away unwanted high index resinous material before casting the second low refractive index resinous material.

7. A method as in claim 4 wherein the high refractive index lens material is shaped by cutting away unwanted high index resinous material before casting the second low refractive index resinous material.

8. A method as in claim 1 wherein the optical axis of the longer convex radius and shorter convex radius are the same.

9. A method as in claim 2 wherein the optical axis of the longer convex radius and shorter convex radius are the same.

10. A method as in claim 3 wherein the optical axis of the longer convex radius and shorter convex radius are the same.

11. A method as in claim 1 wherein the higher refractive index resinous material is incased within the lower refractive index resinous material.

12. A method as in claim 2 wherein the higher refractive index resinous material is incased within the lower refractive index resinous material.

13. A method as in claim 3 wherein the higher refractive index resinous material is incased within the lower refractive index resinous material.

14. A method as in claim 4 wherein the higher refractive index resinous material is incased within the lower refractive index resinous material.

* * * * *